US010160475B2

(12) United States Patent
Uesaka

(10) Patent No.: US 10,160,475 B2
(45) Date of Patent: Dec. 25, 2018

(54) STEERING COLUMN DEVICE

(71) Applicant: FUJI KIKO Co., Ltd., Shizuoka (JP)

(72) Inventor: Yota Uesaka, Shizuoka (JP)

(73) Assignee: FUJI KIKO Co., Ltd., Kosai-shi (JP)

( * ) Notice: Subject to any disclaimer, the term of this patent is extended or adjusted under 35 U.S.C. 154(b) by 75 days.

(21) Appl. No.: 15/461,596

(22) Filed: Mar. 17, 2017

(65) Prior Publication Data

US 2017/0274922 A1 Sep. 28, 2017

(30) Foreign Application Priority Data

Mar. 25, 2016 (JP) ................................ 2016-061183

(51) Int. Cl.
*B62D 1/19* (2006.01)
*B62D 1/184* (2006.01)
*B62D 1/185* (2006.01)
*B62D 1/189* (2006.01)

(52) U.S. Cl.
CPC ............ *B62D 1/184* (2013.01); *B62D 1/185* (2013.01); *B62D 1/189* (2013.01); *B62D 1/19* (2013.01); *B62D 1/192* (2013.01)

(58) Field of Classification Search
CPC ............ B62D 1/19; B62D 1/192; B62D 1/195
See application file for complete search history.

(56) References Cited

U.S. PATENT DOCUMENTS 9,545,943 B2 * 1/2017 Sakuda .............. B62D 1/185
9,849,906 B2 * 12/2017 Uesaka .............. B62D 1/195

10,011,293 B2 * 7/2018 Nagatani ............ B62D 1/184
2011/0185839 A1 8/2011 Inoue
2016/0159387 A1* 6/2016 Okano ............... B62D 1/184
74/493
2017/0355392 A1* 12/2017 Nagatani ............ B62D 1/184

FOREIGN PATENT DOCUMENTS

| DE | 102015115923 A1 * | 3/2017 | ............ B62D 1/184 |
| DE | 102016220532 A1 * | 4/2018 | ............ B62D 1/192 |
| EP | 3048031 A2 | 7/2016 | |
| EP | 3072779 A1 | 9/2016 | |
| GB | 2291840 A | 2/1996 | |
| JP | H10-509395 A | 9/1998 | |
| JP | 2016-112989 A | 6/2016 | |

OTHER PUBLICATIONS

An Extended European search report dated Dec. 7, 2017 in the counterpart European patent application.

* cited by examiner

*Primary Examiner* — Nicole T Verley
(74) *Attorney, Agent, or Firm* — Metrolexis Law Group, PLLC

(57) ABSTRACT

In a steering column device, a locking shaft is disposed on a vehicle front side relative to an operating shaft for an operating lever in parallel to the operating shaft. On the locking shaft, a cam member is disposed which is configured to press a locking member against a locked member via a guiderail in such a direction as to engage the locking member with the locked member. On the other hand, on the operating shaft, a linking member is disposed which is configured to bring the cam member into a state where the locking member and the locked member are disengaged from each other when the operating shaft is moved to an unlock position.

4 Claims, 8 Drawing Sheets

STEERING COLUMN DEVICE

CROSS REFERENCE TO RELATED APPLICATION

The present application is based on, and claims priority from Japanese Patent Application No. 2016-061183, filed Mar. 25, 2016, the disclosure of which is hereby incorporated by reference herein in its entirety.

TECHNICAL FIELD

The present invention relates to a steering column device.

BACKGROUND ART

As this type of steering column device, there has been one including a lower jacket swingably supported to a vehicle body, an upper jacket inserted in the lower jacket in such a way as to be movable in a tube-axis direction, a locking mechanism configured to lock the upper jacket to the lower jacket, and an energy absorbing mechanism configured to absorb impact energy in a secondary collision.

A steering column device described in Patent Literature 1 (Published Japanese Translation of PCT International Application No. Hei 10-509395) is such that, in a locked state by a locking mechanism, a cam presses a toothed slipper into mesh with a toothed rack provided on a steering column tube. Thus, in a secondary collision, the toothed slipper moves in the axial direction together with the steering column tube, and a strap as an energy absorbing member caught at one end on the toothed slipper is pulled and deformed, thereby absorbing the impact energy.

SUMMARY

The steering column device described in Patent Literature 1 might experience what is called a half-locked state in which the tips of the teeth of the toothed rack and the toothed slipper are in contact with each other. A problem in such a case is that the cam cannot be turned, which makes impossible the locking in the tilt direction that should be done at the same time.

In view of this, an object of the present invention is to provide a steering column device capable of allowing proper clamping by an operating shaft even when a locking member and a locked member fall into a half-locked state.

A steering column device according to the present invention includes: a lower jacket formed in a tubular shape and configured to be swingably supported to a vehicle body; an upper jacket formed in a tubular shape and inserted in the lower jacket in such a way as to be movable in a tube-axis direction; a locking mechanism including an operating lever capable of being operated between a lock position where the upper jacket is locked to the lower jacket and an unlock position where the upper jacket is movable in a tube-axis direction of the lower jacket; and an energy absorbing mechanism disposed between the lower jacket and the upper jacket and configured to absorb impact energy applied to the upper jacket in the tube-axis direction via deformation of an energy absorbing member. The locking mechanism includes: an operating shaft to which the operating lever is attached and which is turnable between the lock position and the unlock position; a locking shaft disposed on a vehicle front side relative to the operating shaft in parallel to the operating shaft; a guiderail disposed in a slit formed in the lower jacket along the tube-axis direction, and having one end portion swingably supported to a tip portion of the slit and another end portion disposed between the upper jacket and the locking shaft; a locking member including a catching claw and disposed to be movable along the guiderail; a locked member which is disposed on a portion of an outer peripheral surface of the upper jacket that the locking member faces and in which a plurality of catching recesses that the catching claw of the locking member is engageable with are formed in the tube-axis direction; a cam member disposed on the locking shaft and configured to press the locking member against the locked member via the guiderail in such a direction as to engage the locking member with the locked member; a biasing member configured to bias the cam member in the engaging direction; and a linking member disposed on the operating shaft and configured to bring the cam member into a state where the locking member and the locked member are disengaged from each other when the operating shaft is moved to the unlock position. A wire member which functions as the energy absorbing member is formed in a U-shape such that a catching part at one end is caught on the locking member, a curved part at a middle section is curved around an outer periphery of the cam member, and a turned part at another end section is turned backward.

In the steering column device according to the present invention, the locking member is disposed on the locking shaft, which is a shaft other than the operating shaft for the operating lever. Hence, even when the locking member and the locked member fall into a half-locked state, clamping by the operating shaft can be properly done.

Since it is only the linking member that is disposed on the operating shaft, the operating shaft can be disposed near the upper jacket. This brings about an advantageous effect that the freedom in layout is improved.

A part of the wire member, which functions as an energy absorbing member, is hooked on the locking member. Thus, when the wire member is pulled, a moment is generated in such a direction as to press the locking member against the locked member, thereby preventing disengagement. Also, even if the locking member and the locked member are originally in a half-locked state, the locking member is pressed against and therefore engaged with the locked member.

DESCRIPTION OF EMBODIMENTS

Figure 1:
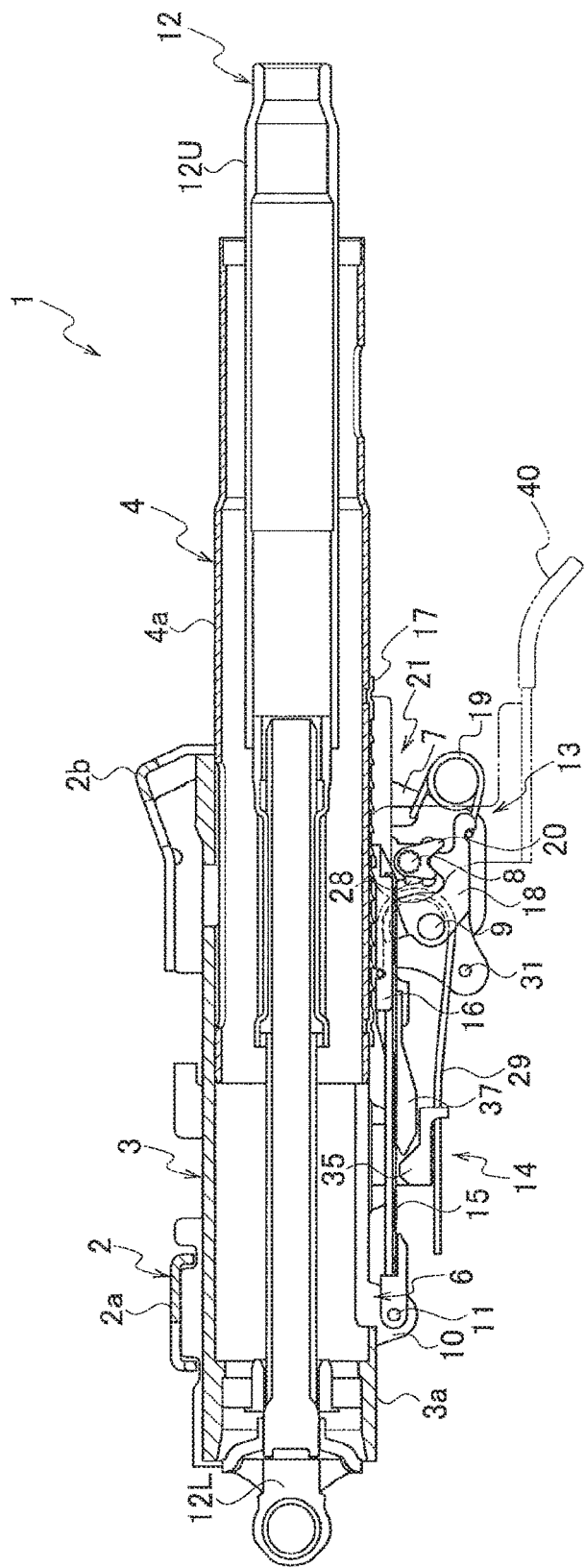
FIG. 1 is a side cross-sectional view of a steering column device according to an embodiment of the present invention.

Embodiments of the present invention will be described below in detail with reference to the drawings.

An embodiment illustrated in FIG. 1 to FIG. 9 is a manual-type steering column device 1.

The steering column device 1 includes: an attachment bracket 2 for fixing the steering column device 1 to a vehicle body; a lower jacket 3 supported to the attachment bracket 2 in such a way as to be swingable in a vehicle vertical direction (capable of adjusting its tilt position); and an upper jacket 4 supported to the lower jacket 3 in such a way as to be movable in a vehicle longitudinal direction (capable of adjusting its telescopic position).

The steering column device 1 further includes: a locking mechanism 13 configured to fasten the attachment bracket 2, the lower jacket 3, and the upper jacket 4; an energy absorbing mechanism 14 configured to absorb impact energy in a secondary collision; and a telescopic-position restricting mechanism 5 configured to define an adjustment range for the position of the upper jacket 4 relative to the lower jacket 3 in the vehicle longitudinal direction (telescopic position).

The attachment bracket 2 includes a front fixing part 2a and a rear fixing part 2b configured to be fixed to the vehicle body's steering member (not illustrated). The front fixing part 2a includes a pivot portion configured to pivotally support the lower jacket 3 such that the lower jacket 3 can be swung, and the rear fixing part 2b includes a pair of hanging portions hanging from its right and left edges. Both hanging portions are provided with a tilt slot bored to define a tilt-position adjustment range along the vehicle vertical direction (tilt direction). The tilt slot is formed of an elongated hole arched about the pivot portion.

The lower jacket 3 is also called "outer column". This lower jacket 3 is formed in a tubular shape and arranged between the pair of hanging portions of the attachment bracket 2 along the vehicle longitudinal direction. The lower jacket 3 has its front end portion pivotally supported to the pivot portion of the front fixing part 2a of the attachment bracket 2 with a bolt. In this way, the rear end side of the lower jacket 3 can swing in the vehicle vertical direction.

Figure 2:
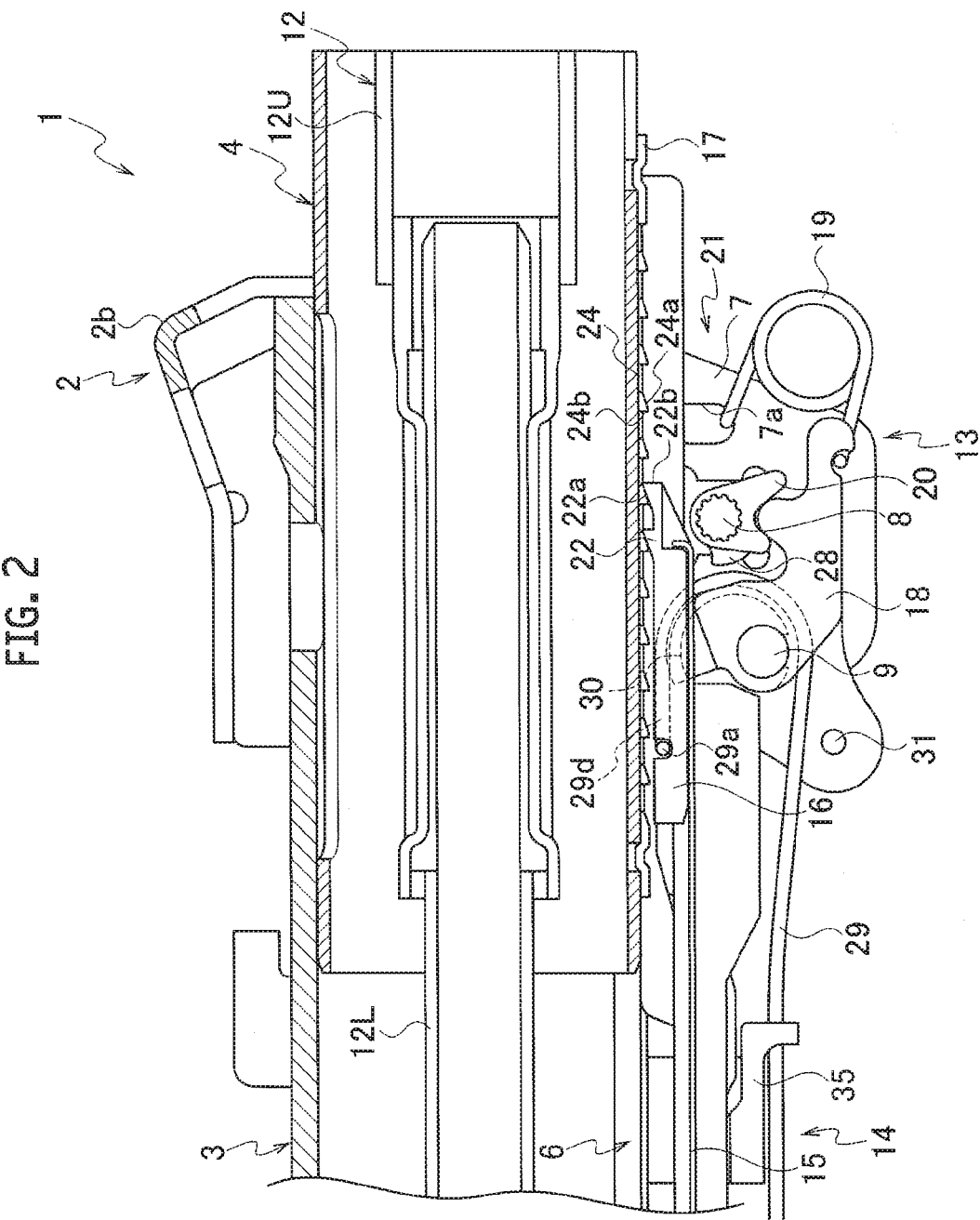
FIG. 2 is an enlarged view of a main part in FIG. 1.

Moreover, as illustrated in FIGS. 1 and 2, the lower jacket 3 includes a slit 6 penetrating through the lower surface of a tubular wall 3a and extending from the rear edge along the tube-axis direction. The dimension of the slit 6 in the tube-axis direction is set such that the slit 6 extends to a portion of the lower jacket 3 overlapping the front end of the upper jacket 4 in a state where the upper jacket 4, inserted in the rear end of the lower jacket 3, is fully contracted by absorbing an impact and moved forward relative to the lower jacket 3.

As illustrated in FIGS. 1 and 2, a pair of clamp parts 7 are provided to extend from the opposite edges of the slit 6 extending along the tube-axis direction. Both clamp parts 7 are provided to extend along the vehicle vertical direction at sections located on the rear end side of the slit 6 and facing the hanging portions of the attachment bracket 2. Moreover, an operating shaft 8 penetrates through both clamp parts 7 in such a way as to be turnable about its axis, and a locking shaft 9 is disposed in parallel to the operating shaft 8.

A pair of guiderail supporting parts 10 are provided to extend downward from front end portions of the opposite edges of the slit 6 extending along the tube-axis direction, and a supporting pin 11 is laid between the guiderail supporting parts 10. A later-described guiderail 15 is swingably supported on the supporting pin 11. A pair of hook parts (not illustrated) is provided to extend downward from the rear side of the guiderail supporting parts 10, and a later-described front stopper 35 is held between the hook parts.

The upper jacket 4 is also called "inner column". This upper jacket 4 is formed in a tubular shape and inserted in the tube of the lower jacket 3 in such a way as to be movable in the tube-axis direction. A steering shaft 12 is rotatably supported inside the tubes of the upper jacket 4 and the lower jacket 3. The steering shaft 12 includes a lower shaft 12L housed in the lower jacket 3 and an upper shaft 12U housed in the upper jacket 4. The upper shaft 12U and the lower shaft 12L are coupled to each other with a spline(s). Thus, the upper shaft 12U and the lower shaft 12L can rotate together about an axis, and the upper shaft 12U can move relative to the lower shaft 12L in the direction of the axis.

Figure 3:
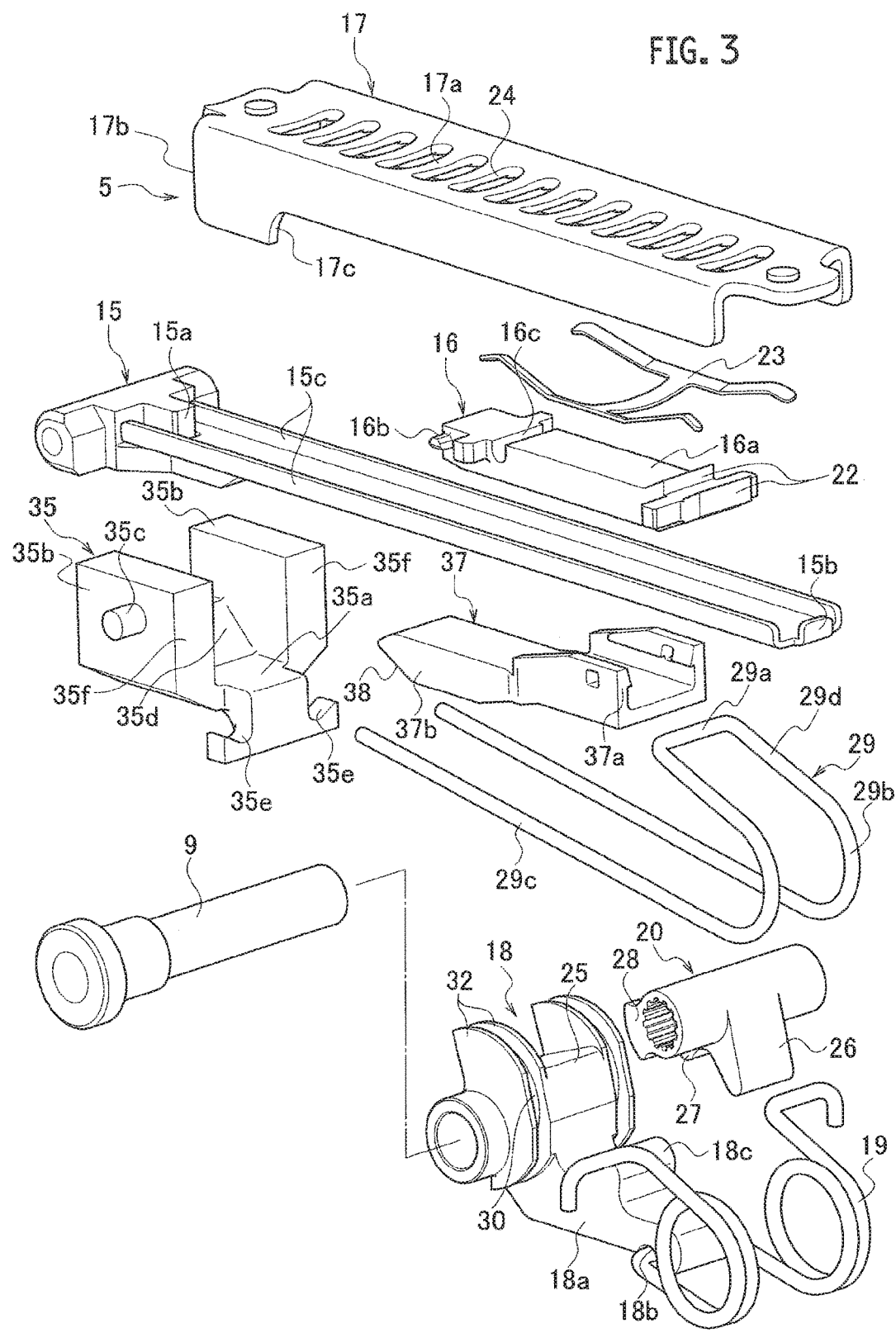
FIG. 3 is an exploded perspective view illustrating the configurations of a locking mechanism and an energy absorbing mechanism.

As illustrated in FIGS. 2 and 3, the locking mechanism 13 includes an operating lever (not illustrated), the operating shaft 8, the locking shaft 9, the guiderail 15, a locking member 16, a locked member 17, a cam member 18, a biasing member 19, and a linking member 20.

The operating shaft 8 has a shaft shape, penetrates through the tilt slots in both hanging portions of the attachment bracket 2 and both clamp parts 7 of the lower jacket 3 along the vehicle width direction, and is supported to the clamp part 7 in such a way as to be turnable about its axis. Also, like the operating shaft 8, the locking shaft 9 has a shaft shape, is inserted in the tilt slots in both hanging portions of the attachment bracket 2 and both clamp parts 7 of the lower jacket 3 along the vehicle width direction. The locking shaft 9 is press-fitted in one of the clamp parts 7 and inserted in the other clamp part 7 in such a way as to be movable in its axial direction. This locking shaft 9 is disposed in parallel to the operating shaft 8 on a vehicle front side and an outer side in the tube radial direction (a vehicle lower side in the illustrated example) relative to the operating shaft 8.

The operating lever 40 and a clamp mechanism 21 are disposed on the operating shaft 8 as illustrated in FIG. 1.

As illustrated in FIG. 3, the guiderail 15 is formed of a member including a front wall part 15a, a rear wall part 15b, and a pair of side wall parts 15c. The front end of the guiderail 15 is pivotally supported to the guiderail supporting parts 10, provided on the outer periphery of the lower jacket 3, with the supporting pin 11 such that the guiderail 15 can be swung, while the rear end side is held between the locking member 16 and the cam member 18. In this case, the cam member 18 presses the locking member 16 against the locked member 17 via the guiderail 15. With such a configuration, a force (frictional force) in the direction of rotation of the cam member 18 is not transmitted to the locking member 16, and only a force in the radial direction is transmitted to the locking member 16. In this way, the upper jacket 4 can be fixed without being displaced in the tube-axis direction from the desired position when a locking operation is performed.

As illustrated in FIG. 3, the locking member 16 includes a base plate 16a which is rectangular in a plan view, and a plurality of catching claws 22, a forcible-release-member catching part 16b, and a wire-member catching part 16c which are formed on or in the base plate 16a. Also, a spring member 23 formed of a leaf spring is disposed between the locking member 16 and the locked member 17.

The catching claws 22 are formed as substantially triangular claws formed on a rear end portion of the base plate 16a. Also, as illustrated in FIG. 2, the catching claws 22 form a row of claws by being formed successively in the tube-axis direction such that they can be engaged with a plurality of catching recesses 24 in the locked member 17 at the same time. Further, as illustrated in FIG. 2, the catching claws 22 of the locking member 16 are each formed in a saw-tooth shape in cross section by a tapered surface 22a and a vertical surface 22b.

The forcible-release-member catching part 16b is a pair of protrusions extending outward in the width direction from the opposite side surfaces of a front end portion of the base plate 16a, and engages a later-described forcible release member 37 to support the forcible release member 37.

The wire-member catching part 16c is a recess provided in the upper surface of the base plate 16a, and engages with a catching part 29a of a later-described wire member 29 to support the wire member 29.

As illustrated in FIG. 3, the locked member 17 is formed of a band-shaped plate member (locking plate) bent in an arched shape along the width direction, and is fixed to the outer peripheral surface of the upper jacket 4 along the tube-axis direction. Also, in the locked member 17, the plurality of catching recesses (locking holes) 24 are bored successively in the longitudinal direction with partition bars 17a separating them, so that the locked member 17 is formed in a ladder shape. Further, as illustrated in FIG. 2, the partition bars 17a of the locked member 17 are each formed in a saw-tooth shape in cross section by a tapered wall surface 24a and a vertical wall surface 24b.

Figure 4:
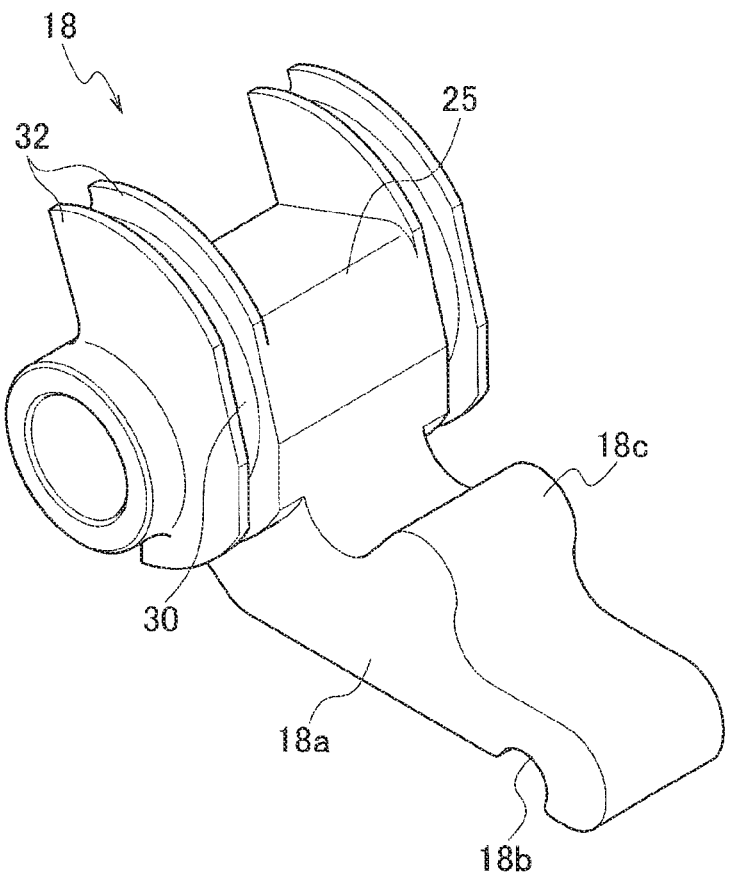
FIG. 4 is a perspective view of a cam member.
Figure 5:
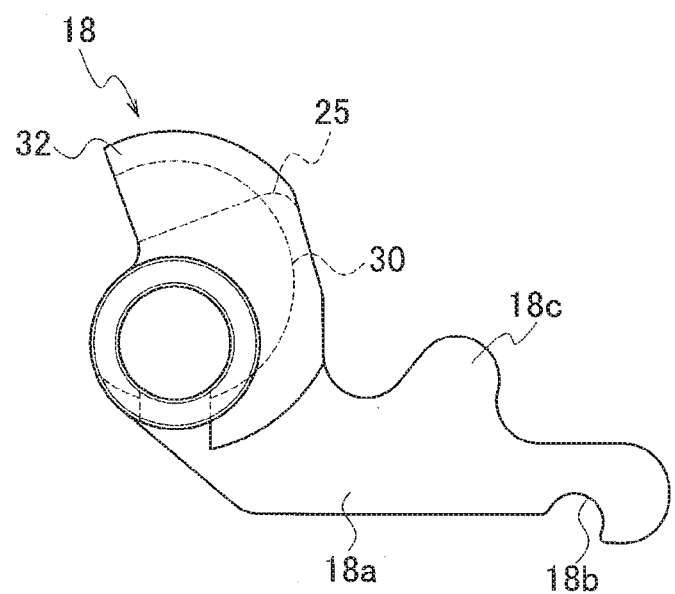
FIG. 5 is a side view of the cam member.

As illustrated in FIGS. 3, 4, and 5, the cam member 18 is formed in a cylindrical shape, and on the outer peripheral surface of its center in the axial direction are formed a driven cam 25 and a lever part 18a protruding in the radial direction. Also, a biasing-member engaging portion 18b for engaging the later-described biasing member 19 is formed in a tip portion of the lever part 18a, and an engaging protrusion 18c is formed between the driven cam 25 and the biasing-member engaging portion 18b. Further, a later-described rubbing part 30 is formed on the outer peripheral surface of each end portion of the cam member 18 in the axial direction.

As illustrated in FIG. 3, the biasing member 19 is formed of a torsion coil spring (double torsion rings) and laid between the lever part 18a (biasing-member engaging portion 18b) of the cam member 18 and the lower jacket 3 (engaging portions 7a formed in the clamp parts 7).

Figure 6:
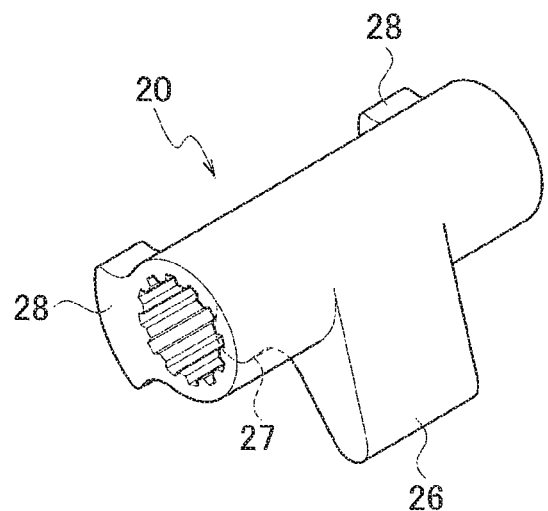
FIG. 6 is a perspective view of a linking member.
Figure 7:
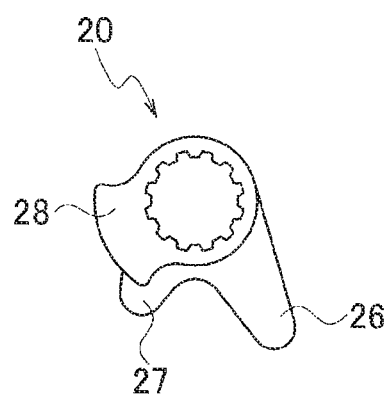
FIG. 7 is a side view of the linking member.
Figure 8:
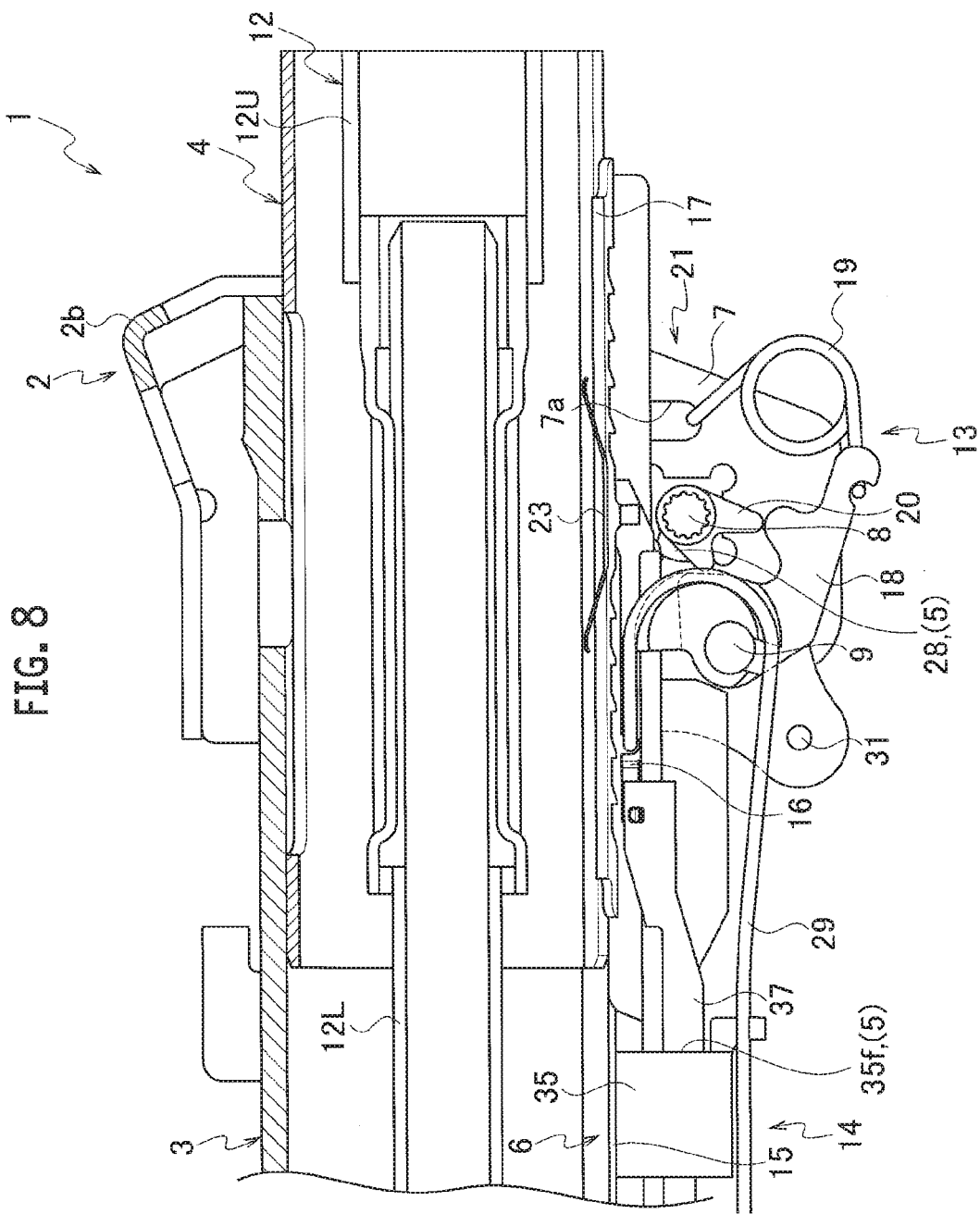
FIG. 8 is an enlarged cross-sectional view of a main part of the steering column device illustrating a state where an operating shaft is at an unlock position.

As illustrated in FIGS. 3, 6, and 7, the linking member 20 is formed in a cylindrical shape, and on the outer surface of its center in the axial direction are formed a drive cam 26 and an auxiliary cam 27 protruding in the radial direction. Also, the operating shaft 8 is fitted in the linking member 20 such that the linking member 20 turns together with the operating shaft 8 about their axes. Further, a later-described rear stopper 28 is formed on the outer peripheral surface of each end portion of the linking member 20 in the axial direction.

The energy absorbing mechanism 14 includes the rubbing parts 30 and an auxiliary shaft 31 for the purpose of forcing bending deformation (plastic deformation) of the wire member 29, which is for impact absorption, by rubbing the wire member 29.

The rubbing parts 30 have a semicircular shape in cross section and are provided integrally with portions of the cam member 18 located on the opposite lateral sides of the driven cam 25. Also, the cylindrical rubbing parts 30 are disposed with their rotational centers offset (shifted) inward in the tube-axis direction from the rotational center of the cam member 18. Further, on the opposite lateral sides of each rubbing part 30 are provided a pair of guide wall parts 32 which have a semicircular shape in cross section and guides movement of the wire member 29.

As illustrated in FIGS. 1 and 2, the auxiliary shaft 31 is disposed in parallel to the operating shaft 8 and the locking shaft 9 with its opposite ends inserted and supported in supporting holes. The auxiliary shaft 31 is disposed such that its position in the tube-axis direction is shifted from the locking shaft 9 and a gap is provided between the auxiliary shaft 31 and the wire member 29.

As illustrated in FIG. 3, the wire member 29 is formed by bending a wire-shaped material at a plurality of spots. Specifically, the wire member 29 is formed in a U-shape in a side view such that the catching part 29a at one end is caught in the wire-member catching part 16c of the locking member 16, curved parts 29b at a middle section are curved around the outer periphery (rubbing parts 30) of the cam member 18, and turned parts 29c at the other end section are turned backward. Also, this wire member 29 is disposed such that its parts 29d connecting the catching part 29a and the positions of the start points of the curves of on the curved parts 29b on the catching part 29a side (positions on the perimeters of the curves) are parallel to the direction of movement of the upper jacket 4.

The turned parts 29c of the wire member 29, which are routed toward the front side, have their front end portions placed on wire-member holding parts 35e of the later-described front stopper 35. As a result, the turned parts 29c are routed along the tube-axis direction and held on the wire-member holding parts 35e of the front stopper 35. Thus, the wire member 29 functions as an energy absorbing member that, when the upper jacket 4 moves in a secondary collision, absorbs the impact energy by being rubbed against the rubbing parts 30 and undergoing bending deformation (plastic deformation).

The telescopic-position restricting mechanism 5, which is illustrated in FIGS. 1 and 2, includes a telescopic-front-end stopper and a telescopic-rear-end stopper configured to engage with the locked member 17 to limit the telescopic range of the upper jacket 4. On the opposite side surfaces of the locked member 17, flanges hanging downward are formed. A front end portion of each flange is formed to be taller, so that a front end surface 17b and a rear end surface 17c are formed.

The telescopic-front-end stopper includes the front end surfaces 17b of the locked member 17 and the front stopper 35, while the telescopic-rear-end stopper includes the rear end surfaces 17c of the locked member 17 and the rear stoppers 28.

As illustrated in FIGS. 6 and 7, the rear stoppers 28 have a protruding shape and are provided integrally with the linking member 20 on portions located on the opposite lateral sides of the drive cam 26 in such a way as to face the rear end surfaces 17c of the locked member 17. The rear stoppers 28 and the rear end surfaces 17c are offset from the rubbing parts 30 of the cam member 18 in the width direction (the axial direction of the locking shaft 9) such that the rear end surfaces 17c can engage with the rear stoppers 28 without contacting the cam member 18.

The front stopper 35 includes a body part 35a as a bottom wall and a pair of parallel leg parts 35b standing upward from the opposite ends of the body part 35a in the vehicle width direction. On the center of the outer side surface of each leg part 35b, a cylindrical protruding portion 35c protruding in the vehicle width direction is provided.

The interval between the outer side surfaces of the pair of leg parts 35b is slightly shorter than the interval between the inner surfaces of the pair of hook parts of the lower jacket 3. Thus, the front stopper 35 can be inserted and installed between the pair of hook parts with the outer side surfaces of the pair of leg parts 35b facing the inner surfaces of the pair of hook parts. Also, rear end surfaces 35f of the pair of leg parts 35b are arranged to face the front end surfaces 17b of the locked member 17.

With this telescopic-position restricting mechanism 5, when the upper jacket 4 is moved rearward in the tube-axis direction for adjusting the telescopic position, the rear end surfaces 17c of the locked member 17 come into contact with the rear stoppers 28 of the linking member 20, thereby limiting (defining) the rear end side of the telescopic-position adjustment range. On the other hand, when the upper jacket 4 is moved forward in the tube-axis direction, the front end surfaces 17b of the locked member 17, attached to the upper jacket 4, come into contact with the rear end surfaces 35f of the front stopper 35, thereby limiting (defining) the front end side of the telescopic-position adjustment range.

A release structure is illustrated in FIGS. 1 and 2. It is configured to release the front stopper 35 from its restricting position and includes the forcible release member 37, as illustrated in FIG. 3.

The forcible release member 37 is a member in the shape of a square bar and arranged on the lower surface of the guiderail 15 along the tube-axis direction. Also, the forcible release member 37 includes fitting hooks 37a at its rear end portion and a wedge part 37b at its front end portion.

The fitting hooks 37a are formed of a pair of claws which are elastic and disposed to face each other. The forcible-release-member catching parts 16b of the locking member 16 are fitted to these fitting hooks 37a via flexural deformation thereof.

The wedge part 37b includes an inclined portion 38 formed at the tip of the lower surface. The thickness of the wedge part 37b between the lower and upper surfaces is set to gradually decrease from the rear end side to the front end side. That is, the inclined portion 38 is inclined with respect to a release direction in which the front stopper 35 is released downward from the restricting position.

The front stopper 35 also includes a wedge receiving surface 35d formed at a portion of the body part 35a that faces the wedge part 37b. The wedge receiving surface 35d is designed as such an inclined surface that the thickness between the lower and upper surfaces gradually increases from the rear side to the front side in the tube-axis direction. That is, the wedge receiving surface 35d is inclined with respect to the release direction in which the front stopper 35 is released downward from the restricting position.

Further, the wedge part 37b of the forcible release member 37 is disposed between both leg parts 35b of the front stopper 35. That is, the forcible release member 37 is arranged along the lower surface of the guiderail 15 by having its rear end portion supported on the locking member 16 and its front end portion supported on the wedge receiving surface 35d of the front stopper 35. Meanwhile, when an impact is applied while the upper jacket 4 is at a front-end side position, the upper jacket 4 is moved forward together with the locking member 16 and the forcible release member 37 but, in some cases, the front end surfaces 17b of the locked member 17 might come into contact with the rear end surfaces 35f before the forcible release member 37 forces the front stopper 35 to be released. In such cases, the protruding portions 35c get fractured, thereby allowing the front stopper 35 to be released.

Procedures of operating the locking mechanism 13 in this embodiment will be described below.

The upper jacket 4 is fixed to a desired position through the following procedure. In a state illustrated in FIG. 8 where the upper jacket 4 and the lower jacket 3 are unfastened from each other, the upper jacket 4 is moved in the tilt direction (vehicle vertical direction) and the telescopic direction (vehicle longitudinal direction) to a desired position. With the upper jacket 4 moved to the desired position, the operating lever is operated to swing in a fastening direction. By operating the operating lever to swing it in the fastening direction, the operating shaft 8 is turned about its axis in the fastening direction.

Consequently, the clamp mechanism 21 is actuated, thereby bringing the hanging portions of the attachment bracket 2 and the clamp parts 7 into pressure contact and hence holding the lower jacket 3 at a given tilt position. By this action, the interval between the pair of clamp parts 7 becomes narrower, so that the lower jacket 3 becomes radially smaller and the upper jacket 4 is hence held at a given telescopic position.

Moreover, the turning of the operating shaft 8 in the fastening direction turns the linking member 20 on the operating shaft 8. Further, as the linking member 20 is turned, the cam member 18 on the locking shaft 9 is turned by the biasing force from the biasing member 19, so that the driven cam 25 presses the locking member 16 against the locked member 17 via the guiderail 15. When the locking member 16 is pressed against the locked member 17, the catching claws 22 of the locking member 16 are inserted into some of the catching recesses 24 in the locked member 17. The tips of the inserted catching claws 22 engage with some of the partition bars 17a, which separate the catching recesses 24 sitting adjacent each other.

Figure 9:
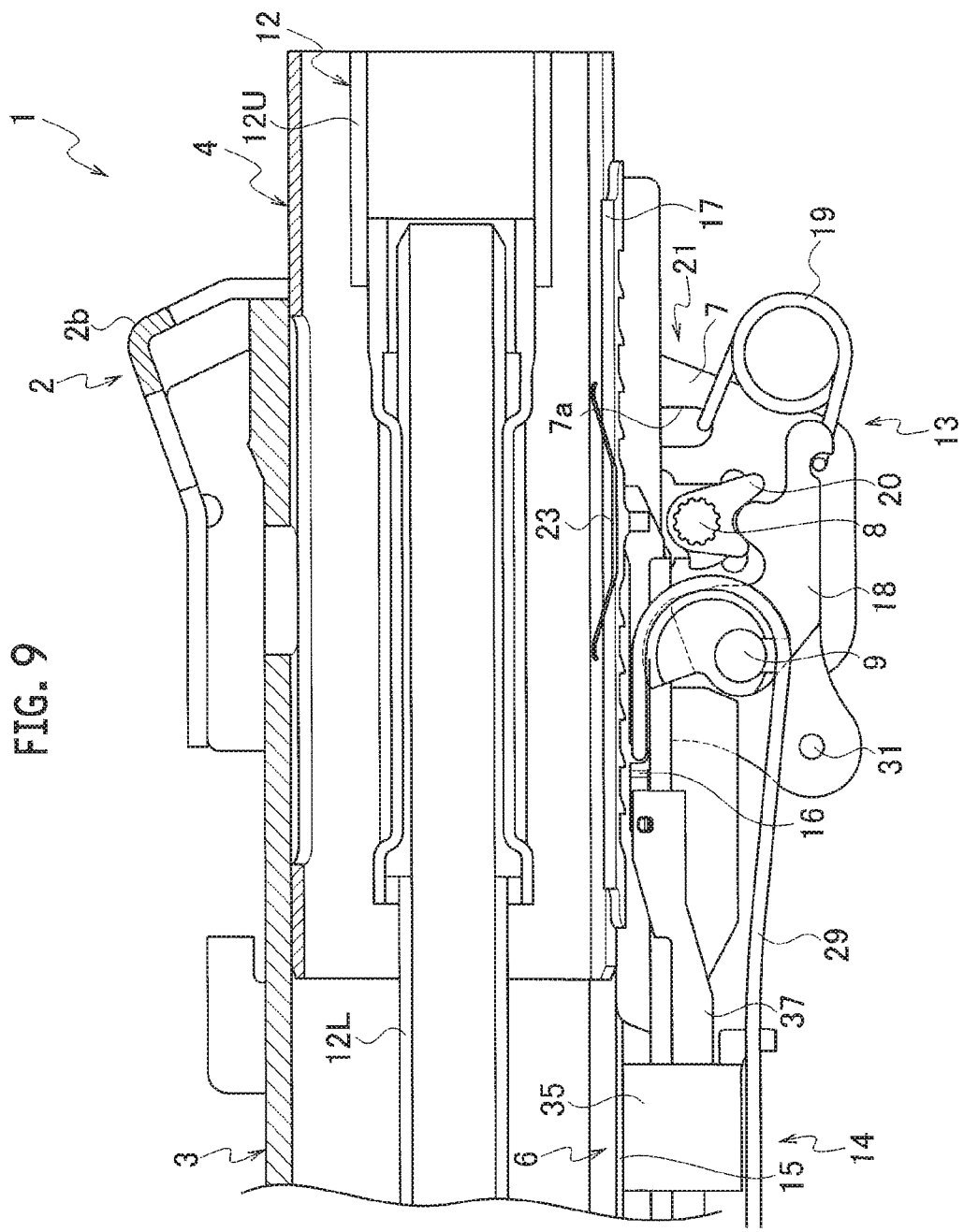
FIG. 9 is an enlarged cross-sectional view of the main part of the steering column device illustrating a state where the operating shaft is at a lock position.

Meanwhile, to adjust the position of the upper jacket 4 from a state illustrated in FIG. 9, the upper jacket 4 and the lower jacket 3 are unfastened from each other. To do so, first, the operating lever is operated to swing in an unfastening direction. By operating the operating lever to swing it in the unfastening direction, the operating shaft 8 is turned about its axis in the unfastening direction.

Consequently, the clamping by the clamp mechanism 21 is released, thereby bringing the hanging portions of the attachment bracket 2 and the clamp parts 7 out of pressure contact and allowing the lower jacket 3 to move relative to the attachment bracket 2 in the tilt direction (vehicle vertical direction). Further, since the interval between the pair of clamp parts 7 has become larger, the lower jacket 3 is made radially larger, thus allowing the upper jacket 4 to move in the telescopic direction (vehicle longitudinal direction).

Moreover, the turning of the operating shaft 8 in the unfastening direction accordingly turns the linking member 20 on the operating shaft 8. Further, as the linking member 20 is turned, the cam member 18 on the locking shaft 9 is also turned against the biasing force from the biasing member 19, so that the driven cam 25 moves in a direction away from the outer peripheral surface of the upper jacket 4. Then, by the elastic force from the spring member 23, which is disposed between the locking member 16 and the locked member 17, the catching claws 22 of the locking member 16 are moved away from the catching recesses 24 of the locked member 17, thereby releasing the lock.

Advantageous effects by this embodiment will be described below.

(1) The steering column device 1 according to this embodiment includes: the lower jacket 3 formed in a tubular shape and configured to be swingably supported to a vehicle body; the upper jacket 4 formed in a tubular shape and inserted in the lower jacket 3 in such a way as to be movable in the tube-axis direction; the locking mechanism 13 including the operating lever capable of being operated between the lock position where the upper jacket 4 is locked to the lower jacket 3 and the unlock position where the upper jacket 4 is movable in the tube-axis direction of the lower jacket 3; and the energy absorbing mechanism 14 disposed between the lower jacket 3 and the upper jacket 4 and configured to absorb impact energy applied to the upper jacket 4 in the tube-axis direction via deformation of the energy absorbing member. The locking mechanism 13 includes: the operating shaft 8 to which the operating lever is attached and which is turnable between the lock position and the unlock position; the locking shaft 9 disposed on a vehicle front side relative to the operating shaft 8 in parallel to the operating shaft 8; the guiderail 15 disposed in the slit 6 formed in the lower jacket 3 along the tube-axis direction, and having one end portion swingably supported to a tip portion of the slit 6 and the other end portion disposed between the upper jacket 4 and the locking shaft 9; the locking member 16 including the catching claws 22 and disposed to be movable along the guiderail 15; the locked member 17 which is disposed on a portion of the outer peripheral surface of the upper jacket 4 facing the locking member 16 faces and in which the plurality of catching recesses 24 that the catching claws 22 of the locking member 16 are engageable with are formed side by side in the tube-axis direction; the cam member 18 disposed on the locking shaft 9 and configured to press the locking member 16 against the locked member 17 via the guiderail 15 in such a direction as to engage the locking member 16 with the locked member 17; the biasing member 19 configured to bias the cam member 18 in the engaging direction; and the linking member 20 disposed on the operating shaft 8 and configured to bring the cam member 18 into a state where the locking member 16 and the locked member 17 are disengaged from each other when the operating shaft 8 is moved to the unlock position. The wire member 29 which functions as the energy absorbing member is formed in a U-shape such that the catching part 29a at one end is caught on the locking member 16, the curved parts 29b at a middle section are curved around the outer periphery of the cam member 18, and the turned parts 29c at the other end section are turned backward.

In the steering column device 1 according to this embodiment, the locking member 16 is disposed on the locking shaft 9, which is a shaft other than the operating shaft 8 for the operating lever. Hence, even when the locking member 16 and the locked member 17 fall into a half-locked state, the clamping by the operating shaft 8 can be properly done.

Since it is only the linking member 20 that is disposed on the operating shaft 8, the operating shaft 8 can be disposed near the upper jacket 4. This brings about an advantageous effect that the freedom in layout is improved.

A part of the wire member 29, which functions as an energy absorbing member, is hooked on the locking member 16. Thus, when the wire member 29 is pulled, a moment is generated in such a direction as to press the locking member 16 against the locked member 17, thereby preventing disengagement. Also, even if the locking member 16 and the locked member 17 are originally in a half-locked state, the locking member 16 is pressed against and therefore engaged with the locked member 17.

(2) The wire member 29 is disposed such that the parts 29d connecting the catching part 29a and the positions of the start points of the curves of the curved parts 29b are parallel to the direction of movement of the upper jacket 4.

When, in a secondary collision, the locking member 16 is moved in the axial direction together with the upper jacket 4, so that the wire member 29 is pulled, no moment is applied in such a direction as to press the locking member 16 against the guiderail 15. Hence, disengagement of the locking member 16 and the locked member 17 and deformation of the guiderail 15 due to such a moment can be prevented.

(3) The catching claws 22 of the locking member 16 are each formed in a saw-tooth shape in cross section by the tapered surface 22a and the vertical surface 22b, and the catching recesses 24 of the locked member 17 are each formed in a saw-tooth shape in cross section by the tapered wall surface 24a and the vertical wall surface 24b.

Even with the locking member 16 and the locked member 17 in a half-locked state, when the locking member 16 is moved during absorption of impact energy, the cam member 18 exhibits relative movement in such a direction as to strengthen the engagement. This prevents disengagement and allows stable impact-energy absorption performance.

Another Embodiment

Figure 10:
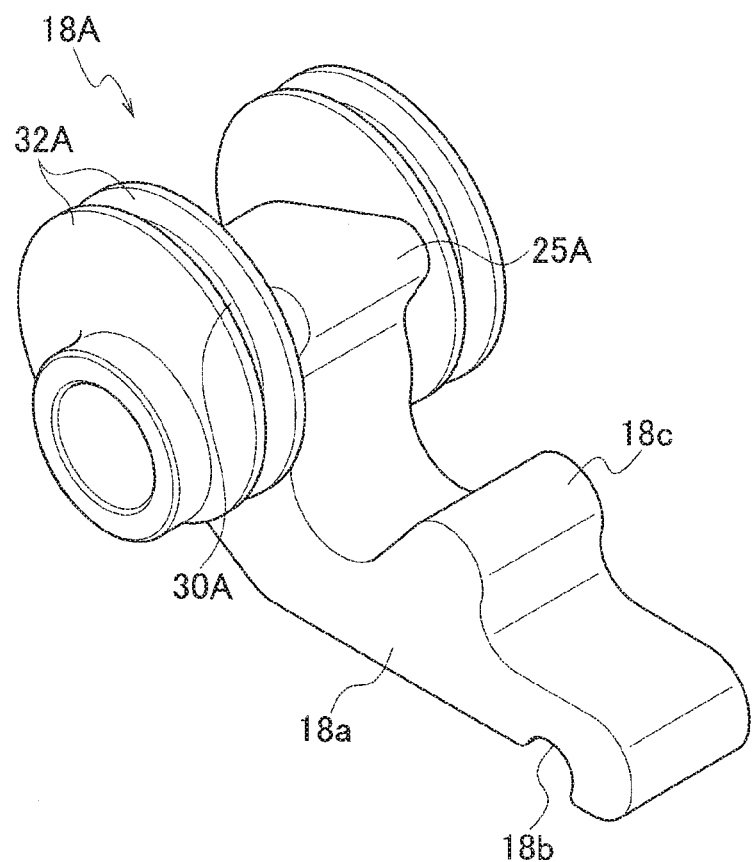
FIG. 10 is a perspective view of a cam member in another embodiment of the present invention.
Figure 11:
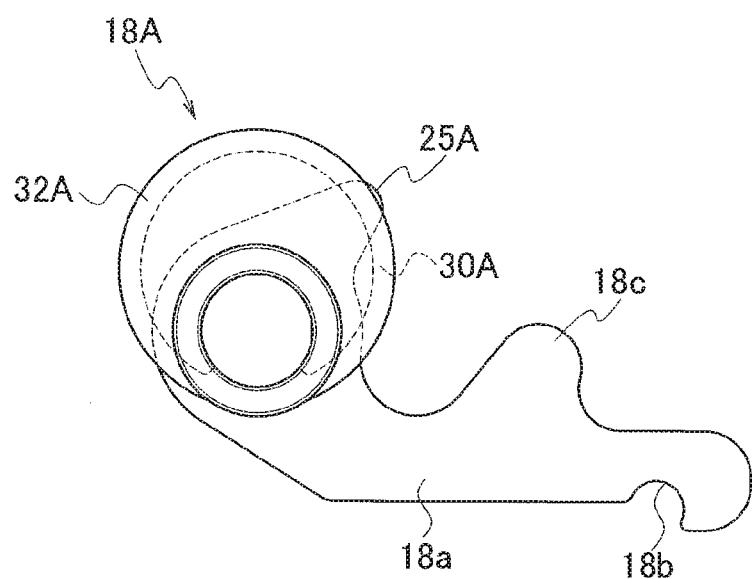
FIG. 11 is a side view of the cam member in the other embodiment of the present invention.

As illustrated in FIGS. 10 and 11, a cam member 18A in another embodiment is such that rubbing parts 30A are formed in a circular shape in cross section and pairs of guide wall parts 32A are formed in a circular shape in cross section. Also, the shape of a driven cam 25A is slightly different from that illustrated in FIGS. 4 and 5, but is not particularly different in terms of function.

Meanwhile, although the steering column device of the present invention has been described by taking the foregoing embodiments as examples, various embodiments other than these embodiments can be employed without departing from the gist of the present invention.

What is claimed is:
1. A steering column device comprising:
    a lower jacket formed in a tubular shape and configured to be swingably supported to a vehicle body;
    an upper jacket formed in a tubular shape and inserted in the lower jacket in such a way as to be movable in a tube-axis direction;
    a locking mechanism including an operating lever capable of being operated between a lock position where the upper jacket is locked to the lower jacket and an unlock position where the upper jacket is movable in a tube-axis direction of the lower jacket; and
    an energy absorbing mechanism disposed between the lower jacket and the upper jacket and configured to absorb impact energy applied to the upper jacket in the tube-axis direction via deformation of an energy absorbing member, wherein
    the locking mechanism includes
        an operating shaft to which the operating lever is attached and which is turnable between the lock position and the unlock position,
        a locking shaft disposed on a vehicle front side relative to the operating shaft in parallel to the operating shaft,
        a guiderail disposed in a slit formed in the lower jacket along the tube-axis direction, and having one end portion swingably supported to a tip portion of the slit and another end portion disposed between the upper jacket and the locking shaft,
        a locking member including a catching claw and disposed to be movable along the guiderail, a locked member which is disposed on a portion of an outer peripheral surface of the upper jacket that the locking member faces and in which a plurality of catching recesses that the catching claw of the locking member is engageable with are formed in the tube-axis direction, a cam member disposed on the locking shaft and configured to press the locking member against the locked member via the guiderail in such a direction as to engage the locking member with the locked member, a biasing member configured to bias the cam member in the engaging direction, and a linking member disposed on the operating shaft and configured to bring the cam member into a state where the locking member and the locked member are disengaged from each other when the operating shaft is moved to the unlock position, and a wire member which functions as the energy absorbing member is formed in a U-shape such that a catching part at one end is caught on the locking member, a curved part at a middle section is curved around an outer periphery of the cam member, and a turned part at another end section is turned backward.

2. The steering column device according to claim 1, wherein the wire member is disposed such that a part thereof connecting the catching part and a position of a start point of the curve of the curved part is parallel to the direction of movement of the upper jacket.

3. The steering column device according to claim 1, wherein the catching claw of the locking member is formed in a saw-tooth shape in cross section by a tapered surface and a vertical surface, and the catching recesses of the locked member are each formed in a saw-tooth shape in cross section by a tapered wall surface and a vertical wall surface.

4. The steering column device according to claim 2, wherein the catching claw of the locking member is formed in a saw-tooth shape in cross section by a tapered surface and a vertical surface, and the catching recesses of the locked member are each formed in a saw-tooth shape in cross section by a tapered wall surface and a vertical wall surface.

* * * * *